United States Patent [19]

Castonguay et al.

[11] Patent Number: 5,261,760
[45] Date of Patent: Nov. 16, 1993

[54] PRECAST CURB SECTION

[75] Inventors: Bertin Castonguay; Réjean Castonguay, both of Ile-des-Soeurs; Waguih Chikani, Ville St-Laurent; Jean Boucher, Charlesbourg; Pierre Michaud, St-Hubert; Gilles Desharnais, St-Bruno; Jacques Marc-Aurele, Pointe du Lac; Elie Chiniara, Ville Mont-Royal, all of Canada

[73] Assignee: Groupe Permacon Inc., Ville d'Anjou, Canada

[21] Appl. No.: 873,794

[22] Filed: Apr. 27, 1992

[30] Foreign Application Priority Data

Mar. 10, 1992 [CA] Canada .................. 2062595

[51] Int. Cl.⁵ ............................................ E01C 11/22
[52] U.S. Cl. .................................... 404/7; 52/165; 411/477; 411/479; 411/922
[58] Field of Search ............... 404/7, 8; 411/477, 478, 411/479, 456, 922; 52/102, 155, 158, 165, 166

[56] References Cited

U.S. PATENT DOCUMENTS

| | | | |
|---|---|---|---|
| 867,388 | 10/1907 | Lerch | 404/7 |
| 1,268,167 | 6/1918 | Shoecraft | 52/165 |
| 1,422,301 | 7/1922 | Parker | 52/165 |
| 3,472,133 | 10/1969 | Ziehm, Jr. | 404/7 |
| 3,822,954 | 7/1974 | Anagariusson | 404/7 |
| 4,203,193 | 5/1980 | Arthur | 411/478 X |
| 4,354,782 | 10/1982 | Newport | 411/479 X |
| 4,971,475 | 11/1990 | Castonguay et al. | 404/7 |

*Primary Examiner*—William P. Neuder
*Attorney, Agent, or Firm*—Foley & Lardner

[57] ABSTRACT

An improved curb section of precast concrete subdivided into modules by transverse grooves which give the appearance of shorter blocks and provide for fracturing the curb section at those locations. Each module of the curb section has a rearward T-shaped projection. L-shaped projection is formed at each end module of the curb section in proximity to the end face so that L-shaped projections of adjacent curb section form a projection equivalent to a T-shaped projection. T-shaped projections and an adjacent pair of L-shaped projections are anchored by sliding a channel-shaped anchor element which engages the projections and has a V-shaped lower end to penetrate the pavement or ground. The modules of the curb section can be of rectangular shape or tapered thereby defining rectilinear elongated curb sections or curved elongated curb sections which can be fastened adjacent to one another.

22 Claims, 3 Drawing Sheets

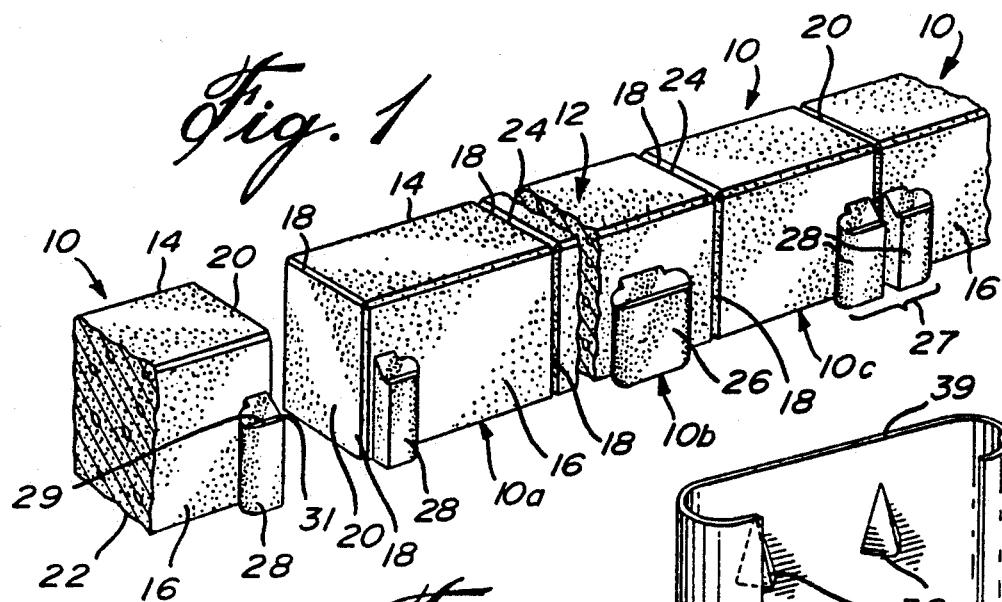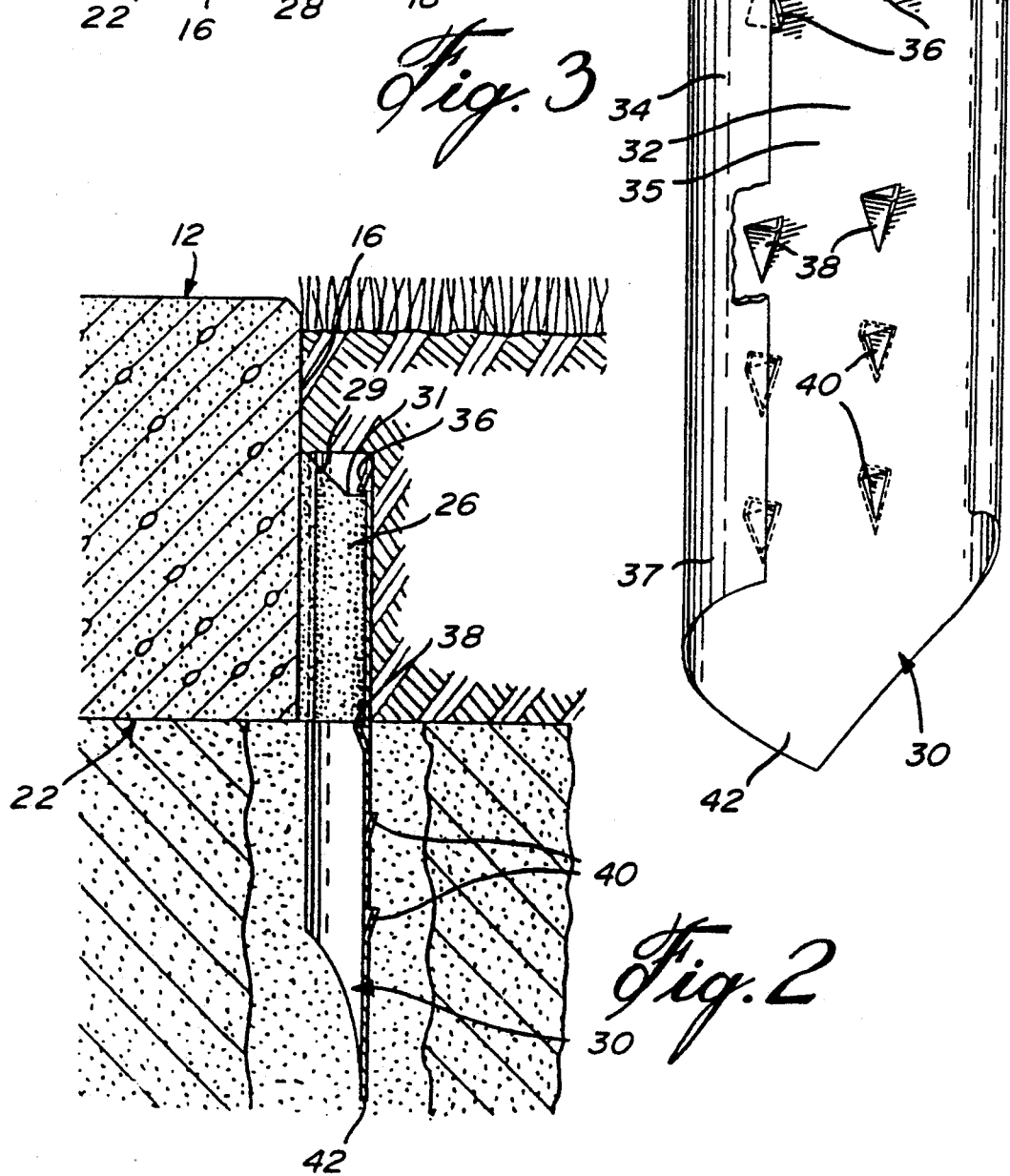

PRECAST CURB SECTION

BACKGROUND OF THE INVENTION

1. Field of the Invention

The present invention relates to precast curb sections, and more particularly, to an improved precast curb assembly and anchoring system.

2. Description of the Prior Art

A curb is a shallow border member having a vertical component used for separating a paved road portion from a lawn or sidewalk. Such curbs or curbstones are utilized in landscaping, i.e., between a patio and lawn section or at the edges of parking lots for restraining automobiles and for preventing the paved section from expanding. Traditionally, such curbs are formed in situ or are precast in sections. A precast curb section may be about 1 meter in length, 20 to 30 cm in height and 8 to 15 cm in width. In order to install such precast sections, it is necessary to dig a trench along the edge of the pavement and to install each curb section in the trench such that the curb is flush or projects above the pavement. These curb sections are usually precast concrete or are cut from stone.

Several developments have been made over the years, such as U.S. Pat. No. 3,822,954, Ansgariusson, 1974, whereby fastener means are provided as part of the precast curb section for fastening the curb section to the pavement, thus eliminating the need for providing a trench and requiring an anchor portion to the curb section.

Another problem with precast curb sections is the fact that in a curb layout, the majority of curb sections are assembled in a straight line, but certain portions are curved requiring separate curved sections. Furthermore, designers are often restricted by the predetermined curvature of the curb sections available.

U.S. Pat. No. 4,971,475, Castonguay et al., 1990, discloses a precast curb section which includes fastening projections on its rear surface extending vertically. The fastening projections are provided with a bore extending parallel to the rear surface and therethrough the height of the projection for passing a fastening means such as a nail, for engaging the base on which the curb is to be installed. Two adjacent curb sections of this patent are each respectively anchored and are not fastened to one another along their respective lateral edges.

Another problem with precast curb sections is that they are not fastened to each other and spacing can occur between two adjacent curb sections.

A further problem with adjacent precast curb sections is that they are not leveled with each others and eventually move vertically relative to each other.

SUMMARY OF THE INVENTION

It is an aim of the present invention to provide a precast curb section with an improved anchoring and fastening feature.

It is also an aim of the present invention to provide precast curb sections with an anchoring system which allows the fastening together of adjacent curb sections, to avoid adjacent curb sections from spreading apart.

It is also an aim of the present invention to provide precast curb sections with an anchoring system which allows the fastening together and leveling of adjacent curb sections, to maintain the curb sections along a plane surface without depressions and prominences.

It is also an aim of the present invention to provide precast curb sections defining a predetermined curvature and provided with an anchoring and fastening feature.

It is a further aim of the present invention to provide precast curb sections defining a predetermined curvature with an improved anchoring system which allows the fastening together and leveling of adjacent curb sections.

A construction in accordance with one embodiment of the present invention comprises an elongated curb section of precast concrete having front, top, rear, and bottom surfaces at least partly in respective intersecting planes. End surfaces are also provided wherein the planes of the end surfaces intersect the planes of the front, top, rear, and bottom surfaces. T-shaped anchor projections are provided on the rear surface of the curb section extending vertically. A channel-shaped anchor element is adapted to be slidably mounted onto each T-shaped projection. The channel-shaped anchor element has fastening means to engage the T-shaped projections and a V-shaped lower end to engage the base on which the curb section is to be installed.

Opposite modules of the elongated curb section are each provided with L-shaped anchor projections, and where L-shaped projections of adjacent curb sections form a T-shaped projection which can be fastened by the channel-shaped anchor elements. One advantage of the curb section according to this embodiment of the present invention is that adjacent curb sections can be fastened together and leveled while they are anchored to the ground.

A construction in accordance with another embodiment of the present invention comprises an elongated curb section of precast concrete having front, top, rear and bottom surfaces in respective intersecting planes, comprising three tapered curb modules defined by two spaced-apart grooves continuous about the front, top and rear surfaces which provide the appearance of modules while providing the curb section with predetermined fractionable portions allowing the curb section to be separated to shorter length modules, the opposite end walls of the curb section and the grooves are either 2.5°, 5° or 7.5° offset from a 90° angle and the three tapered curb modules forming an elongated curb section with the front and rear surfaces defining a curve and wherein the opposite end walls define respectively an angle of 15°, 30° or 45°, spaced-apart vertical projections formed on one of the front and rear surfaces and fastening means for engaging the projections and the base on which the curb is to be installed, thereby anchoring the curb section to the base.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary perspective view of the rear of a curb section in accordance with a first embodiment of the present invention;

FIG. 2 is a vertical cross-section, taken transversely of the curb section of the first embodiment, in a typical operative position;

FIG. 3 is a perspective view of an anchor element in accordance with the first embodiment of the present invention;

DESCRIPTION OF THE PREFERRED EMBODIMENTS

Figure 4:
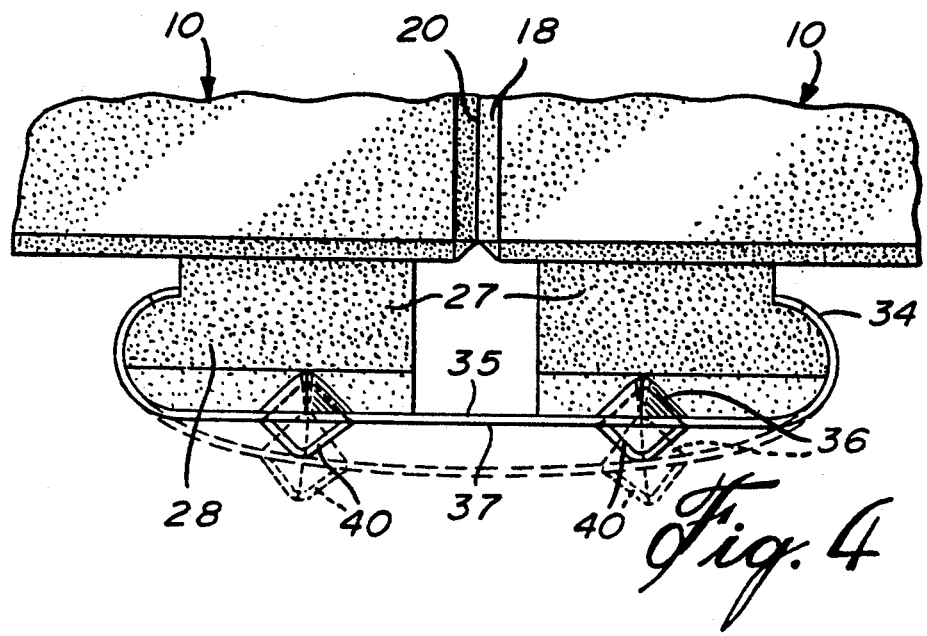
FIG. 4 is a fragmentary top plan view of two adjacent curb sections in accordance with the first embodiment of the present invention fastened together.

Referring now to FIG. 1, there is shown a fragmented curb stone section 10 of precast concrete having a top surface 12 and a front surface 14. The curb section 10 has a rear surface 16, end surfaces 20 and bottom surface 22. All of the edges between the top surface 12 and the front surface 14, rear surface 16 and end faces 20, are bevelled at 18. As shown in FIG. 1, transverse grooves 24 are provided which extend across the top surface 12, front surface 14, and rear surface 16. These grooves 24 may be V-shaped and are continuous about the three faces. These grooves 24 divide the curb section 10 into modules 10a, 10b and 10c and provide an appearance of a plurality of building blocks instead of long unadorned curb-stones. The top surface 12 and front surface 14 can also be provided with a roughened surface to give it the appearance of stone blocks.

The grooves 24 also serve to initiate the fracture of the blocks to a shorter length as will be described later.

On the rear surface 16 there is provided a series of individual T-shaped projections 26 and L-shaped projections 28. An inwardly oriented L-shaped projection 28 is formed at each end of the curb section 10 in proximity to the end face 20, so that L-shaped projections 28 of adjacent curb section 10 form a projection 27 equivalent to a T-shaped projection 26.

As shown in FIG. 2, the top surface of the projections 26 and 28 is sloped at 29 and defines a top planar surface 31. The height of the projections 26 and 28 is at least half the height of the curb section 10. Preferably, there is a projection 26 or 28 for each module 10a, 10b, etc.

A typical curb section 10, in accordance with the embodiment described, has an overall length of 1 meter, a height of 25 cm, and a width of 15 cm. The grooves 24 may have a width of 1.4 cm and a depth of 4 mm. The projections 26 and 28 have an overall height of 14 cm, a height of 12 cm at the outermost point thereof, a distance from the rear surface 16 of 4.0 cm and a width of 7.5 cm.

As shown in FIG. 3, a channel-shaped anchor element 30 is used for anchoring the curb sections at the edge of a pavement in the usual curb location. The channel-shaped anchor element 30 is made of a resilient sheet of material, preferably spring grade steel, defining a substantially planar panel 32 with inwardly curved extremities forming flanges 34. A typical channel-shaped anchor element 30, in accordance with the embodiment described, has an inner channel of 7.5 cm in width. The channel-shaped element 30 is slidably mounted onto the T-shaped projection 26 or adjacent L-shaped projections 28 forming a projection 27 as shown in FIG. 4. The panel 32 of channel-shaped anchor element 30 has an inner surface 35 and an outer surface 37. Stamped anchor protrusions 36 and 38 are projected from the inner surface 35 of the channel-shaped anchor element 30.

When the channel-shaped anchor element 30 is slid onto a projection 26 or adjacent projections 28, as shown in FIGS. 2 and 4, the panel 32 is deformed until the anchor protrusions 38 engage the bottom surface 22 of the projection 26 or 27 and the protrusions 36 engage the top surface 31 of the projection 26 or 27. When the anchor protrusions 36 and 38 snap onto the top surface 31 and bottom surface 22 respectively, the channel-shaped anchor element 30 springs into position as shown in full lines in FIG. 4. The anchor protrusions 36 and 38 when engaging the top surface 31 and bottom surface 22 of adjacent projections 28, causes adjacent curb sections to be fastened together and leveled with each other. Base retaining protrusions 40 are provided on the outer surface 37 of the channel-shaped anchor element 30. These base retaining protrusions 40 prevent the channel-shaped anchor element 30 from moving upwardly once in an anchoring position as shown in FIG. 2. The anchor element 30 has a V-shaped end 42 that can penetrate the pavement or a base such as compacted stone provided for such pavement when it is hammered by hitting the top edge 39.

The projections 26 and 28 have a height which is greater than half the height of the curb section 10 in order to give the anchoring thereof better stability.

Figure 5:
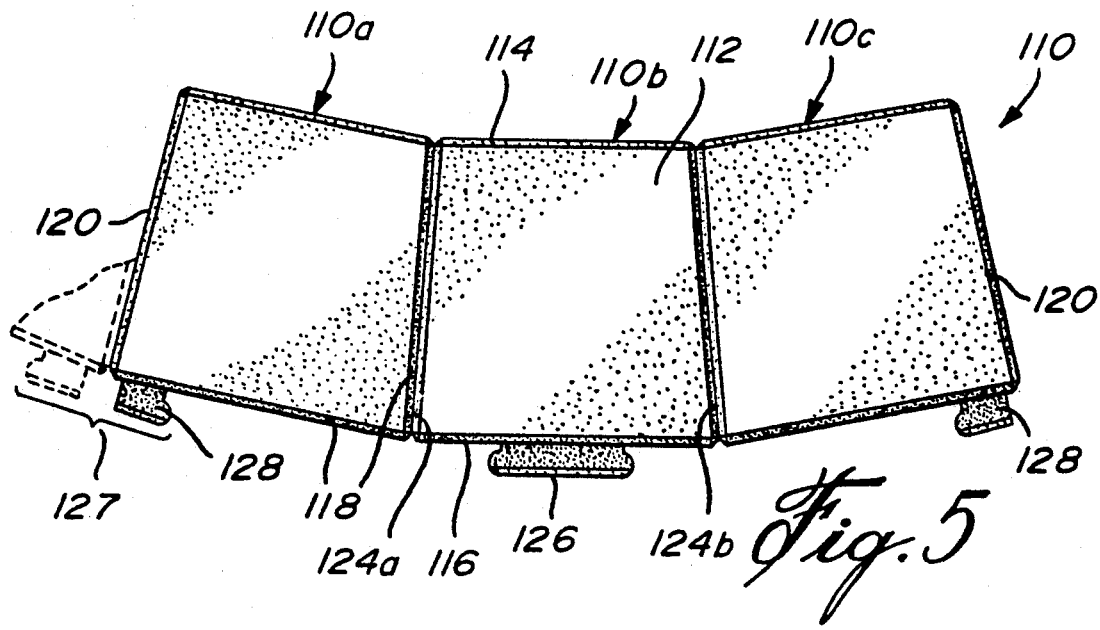
FIG. 5 is a top plan view of a curb section outwardly curved in accordance with a second embodiment of the present invention.

Referring to FIG. 5 there is shown a curb stone section 110 of precast concrete having a top surface 112, front surface 114, rear surface 116 and end surfaces 120. All of the edges between the top surface 112 and the front surface 114, rear surface 116 and end surfaces 120 are bevelled at 118. Transverse grooves 124a and 124b are provided which extend across the top surface 112, front surface 114, and rear surface 116. These grooves 124 divide the curb sections 110 into modules 110a, 110b and 110c and provide an appearance of a plurality of building blocks instead of long unadorned curb stones. The rear surface 116 of the modules 110b is provided with a T-shaped projection 126 and each module 110a and 110c is provided with an inwardly oriented L-shaped projection 128 in proximity to the end surface 120, so that L-shaped projections 128 of adjacent curb section 110 form a projection 127 equivalent to a T-shaped projection 126.

The channel-shaped anchor element 30 can be slidably mounted onto the T-shaped projection 126 and adjacent L-shaped projection 128 as shown in FIG. 4. Each module 110a, 110b and 110c is tapered with each front surface 114 of each module being shorter than each rear surface 116 of each module 110a, 110b and 110c with the front surface 114 and the rear surface 116 defining a concave curve wherein the opposite end surfaces 120 define an angle of 30°. The opposite end surfaces 120 of the curb section 110 and the grooves 124a and 124b are at an angle of 85° with the rear wall 116 and are at an angle of 95° with the front surface 114. The modules 110a, 110b and 110c are tapered towards the front surface to define a concave curve.

Other concave curve-shaped curb section 110 are provided with their opposite end surfaces 120 defining an angle of 15° or 45°. The opposite end surfaces 120 and the grooves 124a and 124b are at an angle of 87.5° or 82.5° with the rear wall 116 and are respectively at an angle of 92.5° or 97.5° with the front surface 114.

Figure 6:
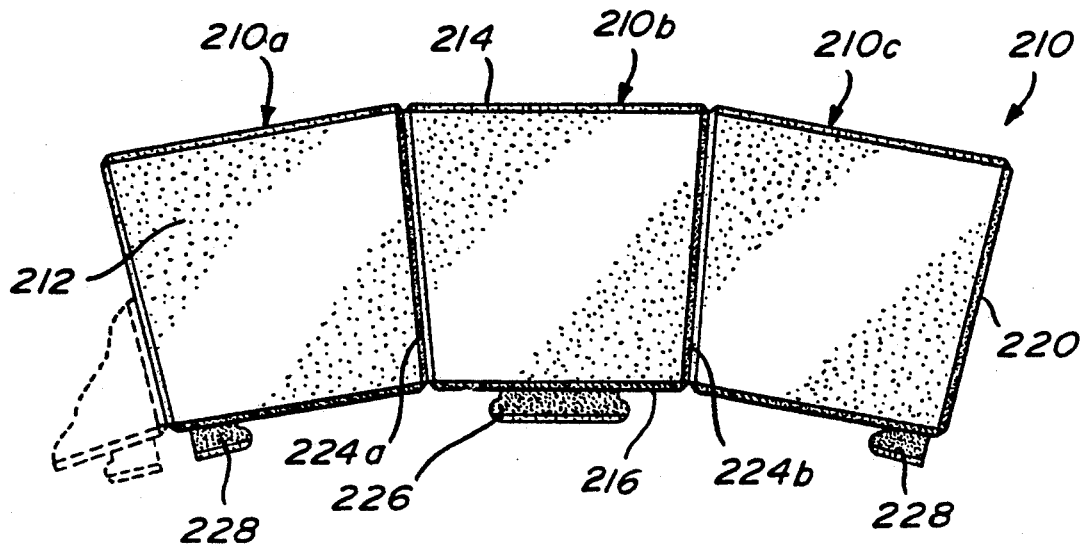
FIG. 6 is a top plan view of a curb section inwardly curved in accordance with a third embodiment of the present invention.

Referring to FIG. 6 there is shown a curb stone section 210 of precast concrete having a top surface 212, front surface 214, rear surface 216 and end surfaces 220. All of the edges between the top surface 212 and the front surface 214, rear surface 216 and end surfaces 220 are bevelled at 218. Transverse grooves 224a and 224b are provided which extend across the top surface 212, front surface 214, and rear surface 216. These grooves 224 divide the curb sections 210 into modules 210a, 210b and 210c and provide an appearance of a plurality of building blocks instead of long unadorned curb stones. The rear surface 216 of the modules 210b is provided with a T-shaped projection 226 and each module 210a and 210c is provided with an inwardly oriented L-shaped projection 228 in proximity to the end surface 220, so that L-shaped projections 228 of adjacent curb section 210 form a projection 227 equivalent to a T-shaped projection 226.

The channel-shaped anchor element 30 can be slidably mounted onto the T-shaped projection 226 and adjacent L-shaped projection 228 as shown in FIG. 4. Each module 210a, 210b and 210c are tapered with each front surface 214 of each module being shorter than each rear surface 216 of each module 210a, 210b and 210c with the front surface 214 and the rear surface 216 defining a concave curve wherein the opposite end surfaces 220 define an angle of 30°. The opposite end surfaces 220 of the curb section 210 and the grooves 224a and 224b are at an angle of 95° with the rear wall 216 and are at an angle of 85° with the front surface 214. The modules 210a, 210b and 210c are tapered towards the front surface to define a concave curve.

Other concave curve-shaped curb section 210 are provided with their opposite end surfaces 220 defining an angle of 15° or 45°. The opposite end surfaces 220 and the grooves 224a and 224b are at an angle of 97.5° or 92.5° with the rear wall 216 and are respectively at an angle of 82.5° or 87.5° with the front surface 214.

Figure 7:
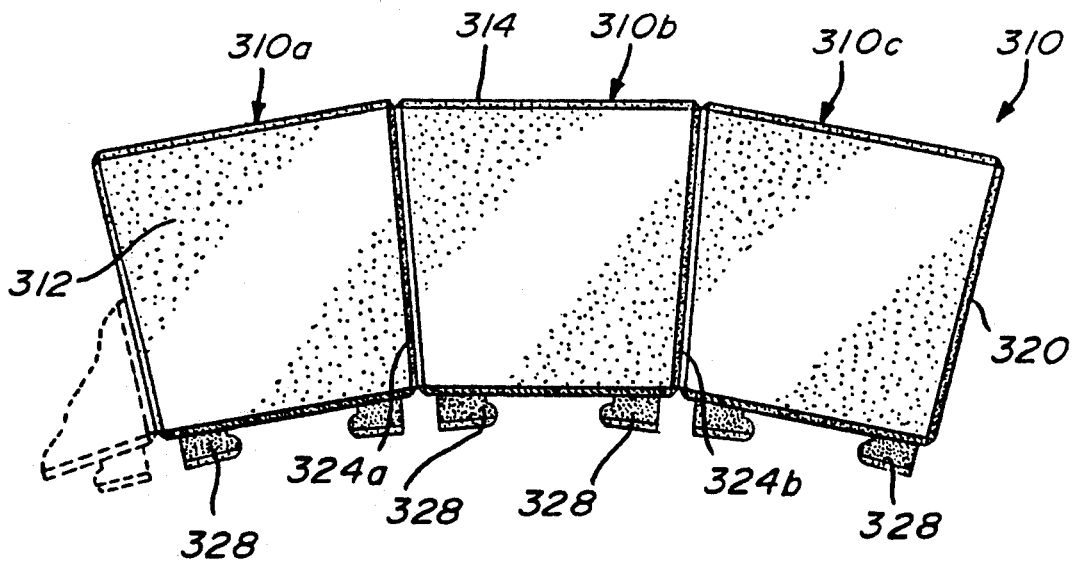
FIG. 7 is a top plan view of a curb section inwardly curved in accordance with a fourth embodiment of the present invention.

Referring to FIG. 7, there is shown a curb stone section 310 of precast concrete having a top surface 312, front surface 314, rear surface 316 and end surfaces 320. All of the edges between the top surface 312 and the front surface 314, rear surface 316 and end surfaces 320 are bevelled at 318. Transverse grooves 324a and 324b are provided which extend across the top surface 312, front surface 314, and rear surface 316. These grooves 324 divide the curb sections 310 into modules 310a, 310b and 310c and provide an appearance of a plurality of building blocks instead of long unadorned curb stones. The rear surface 316 of the modules 310a, 310b and 310c is provided with inwardly oriented L-shaped projection 328 in proximity to the end surface 320 or grooves 324, so that adjacent L-shaped projections 328 of the curb section 310 or of adjacent curb sections 310 form a projection 327 for fastening with a channel-shaped anchor element 30. The L-shaped projections 328 permits for the fractured curb section 310 along the groove 324 to be fastened to an adjacent curb section 310.

In a curb assembly of one embodiment of the present invention, three types of curb section could be provided, that is, a rectilinear curb section 10 with approximately six modules divided by the grooves 24, concave curve-shaped curb section 110 and convex curve-shaped curb section 210. Of course, different varieties of curb sections can be supplied, depending on the appearance required. For instance, the grooves 24 may have varied spacing in order to give the impression of different sized blocks.

The embodiments of the invention in which an exclusive property or privilege is claimed, are defined as follows:

1. An elongated curb section of precast concrete having front, top, rear, and bottom surfaces in respective intersecting planes, end surfaces being provided wherein the planes of the end surfaces intersect the planes of the front, top, rear, and bottom surfaces, spaced-apart vertical T-shaped anchor projections on the rear surface of the curb section, a channel-shaped anchor element adapted to engage said T-shaped projection and the anchor element having a V-shaped lower end for engaging the base on which the curb section is to be installed, said channel-shaped anchor element defining an inner surface which abuts against said T-shaped projection, and fastening means provided on said inner surface to engage the T-shaped projection, said channel-shaped anchor element is slidably mounted onto said T-shaped projections, whereby anchoring said curb section.

2. A curb section in accordance with claim 1, wherein said fastening means comprises stamped anchor protrusions adapted to respectively engage the top and bottom surfaces of said T-shaped projection.

3. A curb section in accordance with claim 1 wherein said channel-shaped anchor element is made of a resilient material which causes said fastening means to resiliently engage said T-shaped projections.

4. A curb section in accordance with claim 3, wherein said resilient material is spring steel.

5. A curb section according to claim 1, wherein opposite ends of said elongated curb section are each provided with inwardly oriented L-shaped anchor projection, and said L-shaped anchor projections of adjacent curb sections form a T-shaped projection which can be fastened by said channel-shaped anchor element, whereby adjacent curb sections are fastened together.

6. A curb section in accordance with claim 3, wherein said channel-shaped anchor element defines an outer surface and wherein base retaining means are provided onto said outer surface, whereby said channel-shaped anchor element is anchored within the base.

7. A curb section in accordance with claim 1, wherein the lines of intersection of said intersecting planes of said surfaces are parallel and said surfaces being further intersected by laterally extending spaced-apart grooves continuous about the front, top and rear surfaces which provide the appearance of a series of modules while providing the curb section with predetermined fractionable portions allowing the curb section to be separated to shorter length modules.

8. A curb section in accordance with claim 7, wherein inwardly oriented L-shaped anchor projections are provided on opposite ends of each modules, and said L-shaped projections adjacent to the grooves of adjacent modules and said L-shaped projections of adjacent curb sections respectively form a T-shaped projection which can be fastened by said channel-shaped anchor element, whereby adjacent curb sections and shorter length modules adjacent to a curb section are fastened together.

9. An elongated curb section of precast concrete having front, top, rear and bottom surfaces in respective intersecting planes, comprising three tapered curb modules defined by two spaced-apart grooves continuous about the front, top and rear surfaces which provide the appearance of modules while providing the curb section with predetermined fractionable portions allowing the curb section to be separated to shorter length modules, each opposite end wall of the curb section and each said groove is 2.5°, 5° or 7.5° offset from a 90° angle and said three tapered curb modules forming an elongated curb section with said front and rear surfaces defining a curve and wherein said opposite end walls define respectively an angle of 15°, 30° or 45°, spaced-apart vertical projections formed on one of the front and rear surfaces, and fastening means for engaging said projections while engaging the base on which the curb is to be installed, thereby anchoring said curb section to the base.

10. An elongated curb section in accordance with claim 9, wherein said vertical projections extending at least one half the height of one of the front and rear surfaces from the bottom surface, and each projection being provided with a bore extending parallel to one of the front and rear surfaces and throughout the height of the projection for passing the fastening means which is elongated and engages the base.

11. A curb section in accordance with claim 10, wherein there is a projection provided on each of said three tapered curb modules.

12. A curb section as defined in claim 10, wherein said projection includes a vertical slot communicating with the bore and tapered walls extend from one of the front and rear wall thereof.

13. A curb section in accordance with claim 9, wherein said projections are T-shaped projections extending at least one half the height of one of the front and rear surfaces from the bottom surface, channel-shaped anchor elements provided with said fastening means to engage said T-shaped projections, and said channel-shaped anchor elements have a V-shaped end for engaging the base and is slidably mounted onto said T-shaped projections.

14. A curb section in accordance with claim 13, wherein said channel-shaped anchor element defines an inner surface which abuts against said T-shaped projection, said fastening means are provided on said inner surface.

15. A curb section in accordance with claim 14, wherein said fastening means comprises stamped anchor protrusions adapted to respectively engage the top and bottom surfaces of said T-shaped projection.

16. A curb section in accordance with claim 13 wherein said channel-shaped anchor element is made of a spring steel which causes said fastening means to resiliently engage said T-shaped projections.

17. A curb section according to claim 13, wherein opposite modules of said elongated curb section are each provided with inwardly oriented L-shaped anchor projection, and L-shaped anchor projections of adjacent curb sections form a T-shaped projection which can be fastened by said channel-shaped anchor element, whereby adjacent curb sections are fastened together.

18. A curb section in accordance with claim 17, wherein inwardly oriented L-shaped anchor projections are provided on opposite ends of each modules, and said L-shaped projections adjacent to the grooves of adjacent modules and said L-shaped projections of adjacent curb sections respectively form a T-shaped projection which can be fastened by said channel-shaped anchor element, whereby adjacent curb sections and shorter length modules adjacent to a curb section are fastened together.

19. A curb section in accordance with claim 16, wherein said channel-shaped anchor element defines an outer surface and wherein base retaining means are provided onto said outer surface, whereby said channel-shaped anchor element is anchored within the base.

20. A system for providing a curb which provides supplying elongated curb sections having front, top, rear and bottom surfaces, said elongated curb section is of a predetermined length divided into modules by transverse grooves continuous about the front, top and rear surfaces providing fractionable sections defining modules where the elongated curb section comprises three tapered curb modules with the opposite end walls defining an angle of 15°, 30° or 45°, and spaced apart T-shaped anchor projections are provided along the rear surface of the curb section, and such that there is one anchoring projection for each module, laying said elongated curb sections along a predetermined curb path, and sliding channel-shaped anchor elements onto said T-shaped projections, wherein said channel-shaped anchor elements having engaging means to engage said T-shaped projection and a V-shaped end for engaging the base on which the curb is to be installed.

21. The system in accordance with claim 20, wherein opposite modules of said elongated curb section are each provided with inwardly oriented L-shaped anchor projection and L-shaped anchor projections of adjacent curb sections form a T-shaped projection which can be fastened by said channel-shaped anchor elements, whereby adjacent curb sections are fastened together.

22. A curb section in accordance with claim 21, wherein inwardly oriented L-shaped anchor projections are provided on opposite ends of each modules, and said L-shaped projections adjacent to the grooves of adjacent modules and said L-shaped projections of adjacent curb sections respectively form a T-shaped projection which can be fastened by said channel-shaped anchor element, whereby adjacent curb sections and shorter length modules adjacent to a curb section are fastened together.

* * * * *